Patented July 6, 1926.

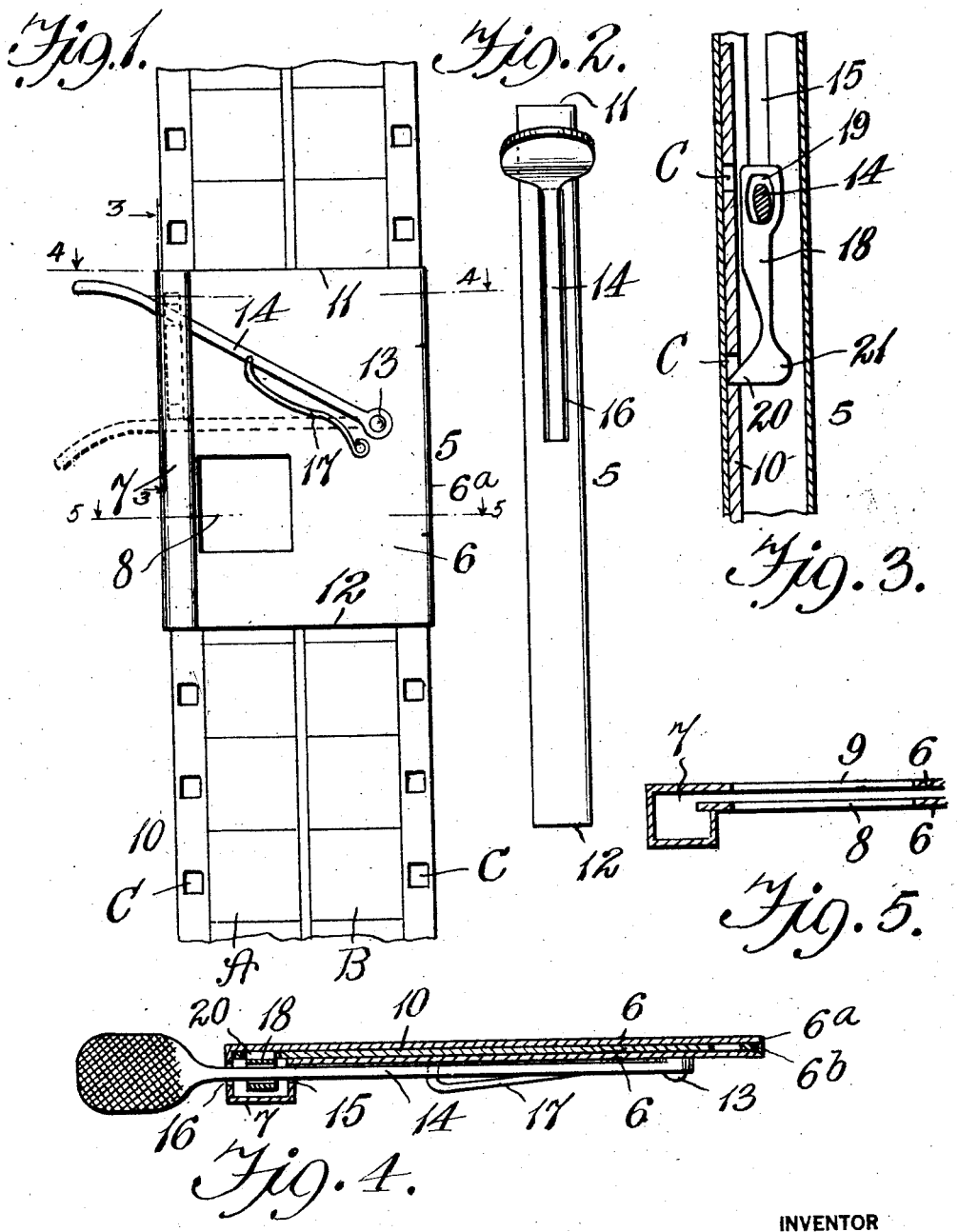

1,591,881

UNITED STATES PATENT OFFICE.

FREEMAN H. OWENS, OF NEW YORK, N. Y.

MOTION-PICTURE APPARATUS.

Application filed May 25, 1923. Serial No. 641,481.

This invention relates to motion picture apparatus and is particularly but not necessarily directed to toys, and same has for its primary object the provision of a device of this character which will be simple of construction, compact and capable of being held in the hand of the operator and held in operative presence of the eye so that the pictures of a film may be exposed to the eye and intermittently moved across the frame opening of the device.

A still further object of the invention is to provide a device of this character which can be used in connection with a film strip of any desired length.

Another object of the invention is to provide a device of this character having a novel film feeding means for moving the film intermittently.

Another object of the invention is to provide a device of this character including a film having a plurality of rows of pictures and means for permitting the pictures of either of said rows to be moved operatively across the frame opening of the device.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a front elevation of the invention.

Figure 2 is an edge view thereof on an enlarged scale.

Figure 3 is a section on the line 3—3 of Figure 1.

Figure 4 is a section on the line 4—4 of Figure 1.

Figure 5 is a section on the line 5—5 of Figure 1.

In the drawings, 5 illustrates a chute formed from a single piece of sheet material preferably metal bent upon itself to provide parallel walls 6, 6 and a vertical housing 7. One wall 6 is formed with a frame opening 8 and the other of said walls is provided with a light opening 9 arranged in horizontal alignment with said opening 8. The walls 6, 6 are spaced apart to provide a film guide and the space between said walls is calculated to snugly accommodate a film 10 and permit the latter to be fed from the upper open end 11 of the chute and discharged from the lower open end 12 thereof.

The opening 8 is formed at one side of the vertical center of the chute and the width of the opening is formed with respect to the size of the film so that the pictures of either of the rows A and B can be operatively exhibited from said opening. This may be quickly accomplished by simply reversing the position of the film or turning the same over and rethreading it in the chute. The film is formed of celluloid treated in the usual manner to permit light to pass therethrough by way of the opening 9.

Beside each of the picture frames of the respective rows A and B and formed in the margin of the film is a sprocket opening C. Pivoted at 13 is an oscillatory lever 14. This lever is extended through the housing 7 and is accommodated in its movements by the slots 15 and 16. These slots are positioned so that their upper walls limit the upward movement of the lever and the lower walls the downward movement thereof. In this manner I am able to operatively register the pictures with the opening 8. A spring 17 carried by the chute 5 is associated with the lever 14 to normally hold same in the full line position shown in Figure 1.

Mounted to slide in the housing 7 is a dog 18 having an eye 19 through which the lever 14 extends as shown in Figure 3. This eye is somewhat larger than the diameter of the lever so that the dog may rock or swing from the lever. The housing 7 opens into the film guide between the walls 6, 6 and is disposed with respect to the adjacent margin of the film whereby to cause the flared nose 20 of said dog to successively engage with said sprocket openings as shown in Figure 3. The dog is formed with a weight extension 21 which acts to advance the nose 20 in co-acting relation to the aforesaid sprocket openings C. On the downward movement of the lever 14 the nose 20 engages in the adjacent sprocket opening C. On the reverse movement of the lever, the dog swings laterally away from the film to free the nose 20 from the sprocket opening C at the frame opening 8 and when the lever 14 reaches the limit of its upward movement, the said nose 20 engages with the next adjacent sprocket opening of said film. In this manner I am able to cause the picture frames of the film to intermittently register with said frame opening 8. The chute has its wall 6$^A$ formed with a spring 6$^B$ which presses against one edge of the film so that the opposite edge is operatively aligned with the aforesaid film moving means. This insures engagement of said means with the sprocket openings of the film.

What is claimed as new is:—

1. A motion picture apparatus comprising a substantially rectangular frame adapted to be held in the hand and having walls defining an open ended chute through which motion picture film may be fed, the said frame having a film exposure opening and means carried by the frame adapted to be manually manipulated for intermittently moving film across said exposure opening, said means including an oscillatable lever pivoted on the frame and extending to one side thereof.

2. A motion picture apparatus comprising a frame adapted to be held in the hand and having walls defining an open ended chute through which motion picture film may be fed, the said frame having a film exposure opening and means carried by the frame adapted to be manually manipulated for intermittently moving film across said exposure opening, said means including a spring controlled and manually operable oscillatable lever pivoted on the frame and a film engaging dog pendingly carried by the lever.

3. A motion picture apparatus comprising a frame adapted to be held in the hand, said frame having its walls contoured to define a film guide or chute and a housing and guide for a film engaging element, the walls of the frame having a film exposure opening, a film engaging element movable longitudinally of the frame within the said housing and guide therefor and means carried by the frame connected to for operating the film engaging element to intermittently move the film across the exposure opening.

4. A motion picture apparatus comprising a frame adapted to be held in the hand, said frame having its walls contoured to define a guide chute for a film and a guide channel for a film engaging element, the wall of the frame having a film exposure opening, a film engaging element movable longitudinally of the frame and within the guide channel, and a spring controlled and manually oscillatable lever pivoted on the frame connected to said film engaging element for operating the same to intermittently move the film.

Signed at New York, in the county of New York, and State of New York, this 19th day of May, A. D. 1923.

FREEMAN H. OWENS.